United States Patent
Hahn et al.

(10) Patent No.: US 9,641,901 B2
(45) Date of Patent: May 2, 2017

(54) METHOD FOR DISPLAYING ELECTRONIC PROGRAM GUIDE OPTIMIZED FOR USER CONVENIENCE

(71) Applicant: PXD, INC., Seoul (KR)

(72) Inventors: Sang-Taek Hahn, Seoul (KR); Kyung-Ah Kim, Seoul (KR)

(73) Assignee: PXD, INC., Dosan-Daero, Gangnam-Gu, Seoul (KR)

( * ) Notice: Subject to any disclaimer, the term of this patent is extended or adjusted under 35 U.S.C. 154(b) by 477 days.

(21) Appl. No.: 13/849,877

(22) Filed: Mar. 25, 2013

(65) Prior Publication Data

US 2014/0123191 A1    May 1, 2014

Related U.S. Application Data

(63) Continuation of application No. 13/588,265, filed on Aug. 17, 2012, now abandoned, which is a (Continued)

(30) Foreign Application Priority Data

Nov. 20, 2008   (KR) .......................... 10-2008-0115950

(51) Int. Cl.
- *H04N 21/482*    (2011.01)
- *H04N 5/445*    (2011.01)

(Continued)

(52) U.S. Cl.
CPC ....... *H04N 21/482* (2013.01); *H04N 5/44543* (2013.01); *H04N 21/4316* (2013.01); *H04N 21/4755* (2013.01)

(58) Field of Classification Search
CPC .......... H04N 21/482; H04N 21/44543; H04N 21/4316; H04N 21/4755; H04N 1/32219; H04N 1/32229; G06F 3/048
(Continued)

(56) References Cited

U.S. PATENT DOCUMENTS

| 7,143,353 | B2 * | 11/2006 | McGee | ............. G06F 17/30814 348/E5.108 |
| 8,170,119 | B2 * | 5/2012 | Bahn | .................... G11B 27/102 375/240.26 |

(Continued)

FOREIGN PATENT DOCUMENTS

| JP | 2000-209518 | 7/2000 |
| JP | 2007-325310 | 12/2007 |
| KR | 2001-0001086 | 1/2001 |

OTHER PUBLICATIONS

Matsushita Electric, Yoshizawa et al., Japan document JP 2007-325310, Dec. 13, 2007.*

(Continued)

*Primary Examiner* — Nathan Flynn
*Assistant Examiner* — Caroline Somera
(74) *Attorney, Agent, or Firm* — John K. Park; Park Law Firm

(57) ABSTRACT

A method for displaying an electronic program guide (EPG), which includes one or more pages divided into a plurality of program name display regions, provides a list of names of currently-broadcast programs through each of the program name display regions such that a user may search all currently-broadcast programs. TV viewers may determine information on currently-broadcast programs through an effective display method with classification criteria, and quickly change a page screen through movement between columns. TV viewers may select a desired broadcasting program from the channels through a minimum key manipulation of a remote control. Program names are classified according to the classification criteria such as genres, recently watched channels, and favorite channels in the EPG. The classification criteria may be set by each user, or
(Continued)

a separate item may be added, so that a user may easily acquire broadcasting program information.

4 Claims, 11 Drawing Sheets

Related U.S. Application Data continuation of application No. 13/341,091, filed on Dec. 30, 2011, now abandoned, which is a continuation of application No. 13/130,343, filed as application No. PCT/KR2009/006066 on Oct. 21, 2009, now abandoned.

(51) Int. Cl.
*H04N 21/431* (2011.01)
*H04N 21/475* (2011.01)

(58) Field of Classification Search
USPC .......................................................... 725/41
See application file for complete search history.

(56) References Cited

U.S. PATENT DOCUMENTS

| | | | |
|---|---|---|---|
| 2002/0021309 A1* | 2/2002 | Burnhouse | G06F 3/0483 715/810 |
| 2003/0208755 A1* | 11/2003 | Zimmerman | H04N 5/44543 725/34 |
| 2004/0055007 A1* | 3/2004 | Allport | H04N 5/44543 725/39 |
| 2008/0209474 A1* | 8/2008 | Pjanovic | H04N 5/44543 725/46 |
| 2009/0089835 A1* | 4/2009 | Watanabe | H04N 5/782 725/39 |
| 2014/0123191 A1* | 5/2014 | Hahn | H04N 21/482 725/41 |

OTHER PUBLICATIONS

International Search Report, dated Jun. 9, 2010, of the corresponding International Application PCT/KR2009/006066.

* cited by examiner

FIG. 2

Program Information

HD Christmas in August

DTV Cable KBS D-1 August 23 (Wed), 2007 PM 2:58 ~ PM 3:52

| 8/23(Wed) | | PM 4:00 | | PM 5:00 | |
|---|---|---|---|---|---|
| DTV-C 6-1 | ▲ ... | Wings... | (HD)Go... | Youth Worldcup | ▲ |
| DTV-C 7-1 | ▲ Maeng-Kong | Mom's knee school | TV Kindergarten Panipani | Doyajiboong | ▲ |
| DTV-C 9-1 | ▲ HD8 ... | ... | Love... | Shinara... | HD... | Animal... | World... | ▲ |
| DTV-C 10-1 | ... | ... | Dingdong | Go! G ... | Angel... | Kid Music... | ▲ |
| DTV-C 11-1 | ▲ Shoba... | Popopo | Jjajang... | ... | [HD] ... | Live... | |

METHOD FOR DISPLAYING ELECTRONIC PROGRAM GUIDE OPTIMIZED FOR USER CONVENIENCE

CROSS-REFERENCE TO RELATED APPLICATION

This application is a continuation of pending U.S. patent application Ser. No. 13/588,265 filed on Aug. 17, 2012, which is a continuation of U.S. patent application Ser. No. 13/341,091 filed on Dec. 30, 2011, which is a continuation of U.S. patent application Ser. No. 13/130,343, filed on May 20, 2011, which is a National Stage Application of International Application No. PCT/KR2009/006066, filed Oct. 21, 2009, and which claims priority to Korean Application No. 10-2008-0115950, filed Nov. 20, 2008, the contents of which are expressly incorporated herein by reference in their entireties.

TECHNICAL FIELD

The present invention relates to a method for displaying an electronic program guide (EPG) optimized for user convenience, and more particularly, a method for displaying an EPG which includes one or more pages which of each is divided into a plurality of program name display regions, and provides a list of the names of currently-broadcast programs through each of the program name display regions such that a user may search all currently-broadcast programs and move and select a program through a simple key manipulation.

BACKGROUND ART

An EPG serves to provide broadcasting program schedule information through a TV screen, and is mainly used for digital broadcasting.

A conventional EGP provides information on broadcasting programs of all channels, and a display method thereof has a table form which basically includes a channel axis and a time axis, like a TV schedule table provided by print media such as newspaper and magazine. That is, the display method of the conventional EGP is provided in such a form that is obtained by reproducing the TV schedule table of print media on a TV screen.

FIG. 1 is a screen shot showing a first example of a conventional EPG, and FIG. 2 is a screen shot showing a second example of a conventional EPG.

Referring to FIGS. 1 and 2, the conventional EPG provided through a digital TV screen has a table which includes channel information set at the vertical axis and time zones set at the horizontal axis, and broadcasting program information corresponding to each channel and time is arranged in the table. Therefore, a viewer can figure out broadcasting programs, as if the viewer looked at a TV schedule table of print media. However, the EPG can display only programs corresponding to four or five channels and two-hour time zone on one screen, because the TV screen has a limited space. Accordingly, a lot of scroll operations are required.

The reason that a viewer utilizes the EPG may be explained as follows. First, the viewer may select a desired broadcasting program which can be currently watched among the entire channels. Second, the viewer may search for a broadcasting program worth to watch after the present time.

However, when the conventional EPG having a channel-time table form is used, it may be a little uncomfortable for the viewer to quickly figure out which programs are currently broadcast for the entire channels.

As shown in FIGS. 1 and 2, the conventional EPG displays currently-broadcast programs which are arranged along the vertical channel axis. Therefore, a viewer should move a cell by ones to check the entire channels. For example, when one hundred channels need to be checked, one hundred remote control manipulations should be performed, which is very inefficient. At this time, a page move key may be separately provided. In this case, the cell move key and the page move key should be alternately used. Furthermore, in order to manipulate the page move key, a viewer should look at the remote control again while seeing the TV screen. In particular, when several tens or hundreds of channels are provided as in the cable or satellite broadcasting, the conventional EPG having a TV schedule form cannot sufficiently satisfy such a viewer's request.

DISCLOSURE

Technical Problem

It is, therefore, an object of the present invention to provide a technology for displaying an EPG optimized for user convenience, through which a TV viewer may quickly figure out broadcasting programs which are currently viewable for the entire channels and immediately check information on a current broadcasting program through minimum key manipulations of a remote control.

Technical Solution

In accordance with an aspect of the present invention, there is provided a method for displaying an electronic EPG, including the steps of: (A) collecting broadcasting program information from received broadcasting signals; (B) acquiring information of currently-broadcast programs from the broadcasting program information; (C) forming an EPG which includes one or more page screens each having a plurality of program name display regions, wherein the program name display regions are classified according to preset classification criteria and texts each including a part of the name of a current-broadcast program (hereinafter, referred to as 'current program names') are listed in each of the classified program name display regions; (E) displaying a page screen through a display unit; (F) moving a focus on the program names arranged on the page screen in four directions according to a user manipulation; and (G) displaying information on a current program name corresponding to the focus on a separate region of the page screen.

The step (C) may include the step of adding one or more of genres, recently-watched channels, recommended programs, and favorite channels to the classification criteria and arranging the current program names according to the classification criteria.

The step (B) may include the step of acquiring information on a program which is to be broadcast after the currently-broadcast program, and the step (C) may include the step of arranging a text including a part of the name of a next program (hereinafter, referred to as 'next program name') such that the next program name is associated with the current program name, when a finish time of the currently-broadcast program falls within a preset reference time from the present time.

The step (E) may include the step of displaying an identification symbol on the page screen, the identification symbol indicating the order of a current page screen among the entire page screens forming the EPG, and the step (F) may include the steps of: when the movement of the focus based on the user manipulation is performed toward the outside of the page screen in the left or right direction, displaying a previous page screen or next page screen; and reflecting the change in the order of the current page screen, which is caused by the page movement, into the identification symbol, and displaying the identification symbol on the page screen.

The step (F) may include the step of maintaining the position of the focus on the entire screen, when the movement of the page screen is performed.

The step (G) may include the step of displaying a lasting time and a remaining time of a broadcasting program corresponding to the current program name where the focus is positioned, by using a graph.

The step (C) comprises the step of vertically dividing the page screen into the plurality of program name display regions, and vertically arranging the classification criteria and the current program names in the respective program name display regions to form the EPG.

The method may further include the steps of: when a broadcasting program corresponding to the current program name was watched and is not yet finished, displaying a snapshot image of a last watched frame of the broadcasting program with the current program name; and when the broadcasting program is finished, removing the snapshot image of the last watched frame from the page screen.

The step (G) may include the step of displaying one or more of a current broadcast frame image, the next program name, a broadcasting time, a channel number, a channel name, and a channel logo of the current program name corresponding to the focus, on the separate region of the page screen.

The method may further include the step of, when the focus highlighting one of the current program names is continuously maintained for a preset time or a separate user manipulation occurs, displaying a list of programs which are to broadcast after the current program name corresponding to the focus, by using a pop-up window.

Advantageous Effects

According to the embodiment of the present invention, TV viewers may easily figure out information on currently-broadcast programs of the entire channels through the effective display method with the classification criteria, and quickly change the page screen through the movement between columns. Therefore, the TV viewers may immediately select a desired broadcasting program from the entire channels through a minimum key manipulation of a remote control.

Furthermore, while the page screen is moved for each genre or each favorite channel in the conventional EPG, the program names are classified according to the classification criteria such as genres, recently watched channels, and favorite channels in the EPG according to the embodiment of the present invention. Therefore, it is possible to effectively use the EPG. The classification criteria may be previously set. Furthermore, the classification criteria may be set by each user, or a separate item may be added so that a user may easily acquire broadcasting program information.

BRIEF DESCRIPTION OF THE DRAWINGS

The above and other objects and features of the present invention will become apparent from the following description of embodiments given in conjunction with the accompanying drawings, in which:

FIG. 2 is a screen shot showing a second example of a conventional EPG;

BEST MODE FOR THE INVENTION

Hereinafter, embodiments of the present invention will be described in detail with reference to the accompanying drawings so that they can be readily implemented by those skilled in the art.

Figure 1:
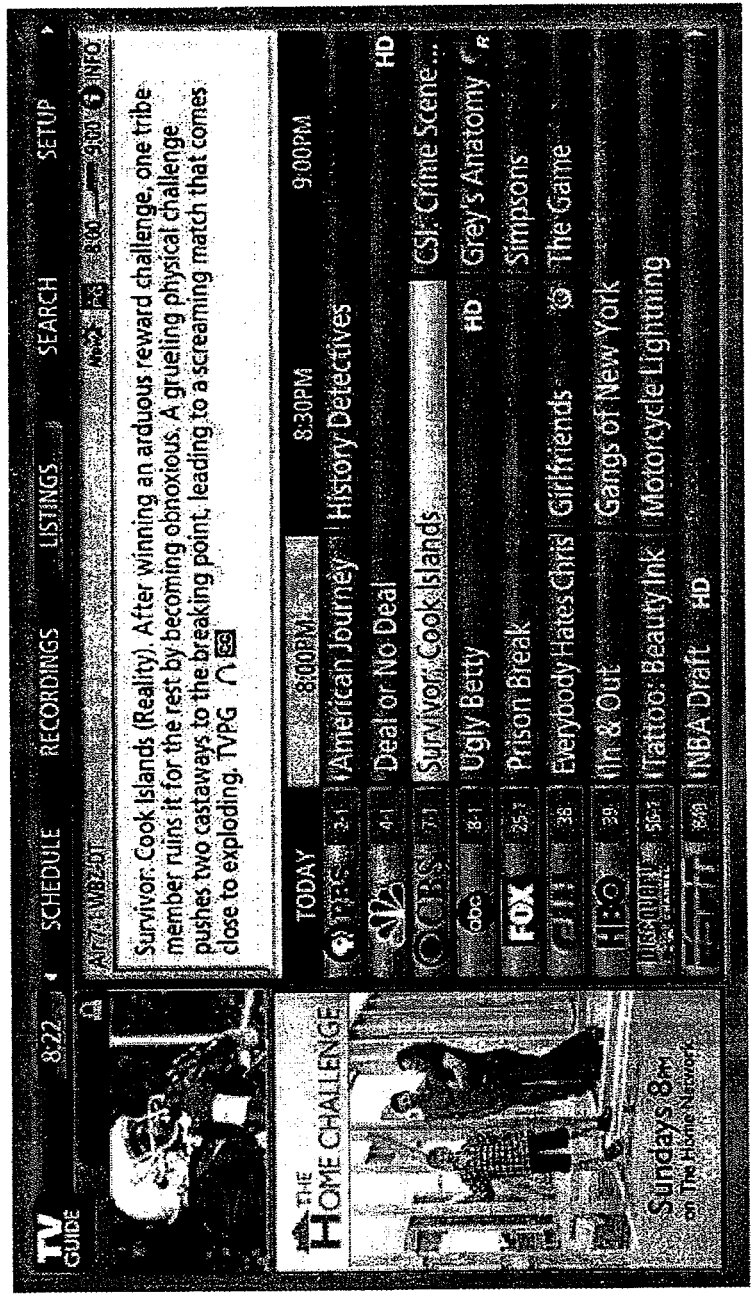
FIG. 1 is a screen shot showing a first example of a conventional EPG.
Figure 3:
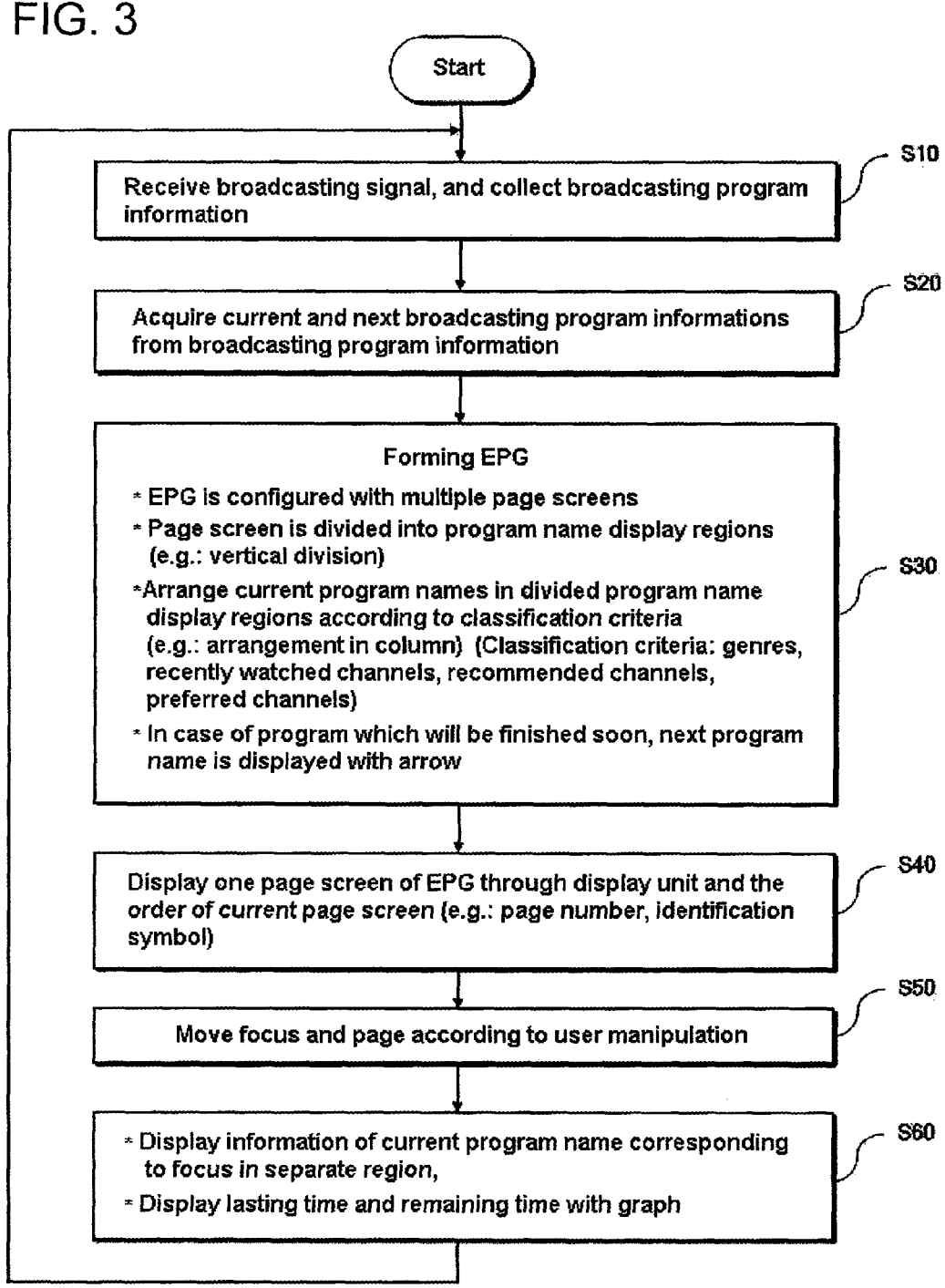
FIG. 3 is a flow chart showing the entire operation process of a method for display an EPG according to an embodiment of the present invention.

FIG. 3 is a flow chart showing the entire operation process of a method for display an EPG according to an embodiment of the present invention.

First, a broadcasting signal is received, and broadcasting program information is collected from the broadcasting signal, at step S10. The broadcasting signal includes a variety of information on a broadcasting program as well as encoded voice data and video data. Therefore, the broadcasting program information is collected and then used for forming an EPG.

Then, information on programs which are currently broadcast (hereinafter, referred to as 'current program information') is acquired from the collected broadcasting program information at step S20. In order to generate the conventional EPG, information on the entire programs which are broadcast during the day should be acquired. In this embodiment of the present invention, however, the EPG may be formed only by the current program information.

At this time, a process of acquiring information (hereinafter, referred to as 'next program information') on programs which are to be broadcast after the currently-broadcast programs may be added. Through this process, the next program information may be provided together immediately before the currently-broadcast programs are finished.

In addition to the current program information and the next program information, the entire program information may be acquired.

Subsequently, an EPG is formed through the acquired current program information at step S30. At this time, the EPG includes one or more page screens each having a plurality of program name display regions. That is, the EPG may include a plurality of page screens of which each is divided into a plurality of program name display regions.

At this time, each of the program name display regions displays a list of texts each of which includes a part of the name of a currently-broadcast program and which are classified according to a preset classification criterion and displayed with the classification criterion. That is, only a part of the program name may be displayed regardless of displaying the entire program name, and the other part may be displayed by ' . . . '. Hereinafter, a text including a part of the name of a currently-broadcast program will be referred to as 'current program name'.

Furthermore, when the finish time of the currently-broadcast program falls within a predetermined reference time from the present time, a text including a part of the name of a next program may be disposed in such a manner as to be associated with the current program name. Hereinafter, a text including a part of the name of a next program will be referred to as 'next program name'.

A specific embodiment of the EPG formed through the above-described process will be described in detail with reference to FIGS. 5 to 9.

After the EPG is formed, one of page screens composing the EPG is displayed through a display unit such as a cathode-ray tube or LCD screen at step S40.

Then, a viewer may move a focus indicating a current program name disposed on the page screen in four directions by manipulating a button of a remote control or TV set, and select a current program name, at step S50. At this time, the focus enables the viewer to distinguish the current program name from other current program names by highlighting the current program name or displaying the current program name with a different color.

At this time, when the viewer moves the focus through a key manipulation in four directions, the viewer not only may select one of the current program names displayed on the current page screen, but also may move to another page screen of the page screens composing the EPG. That is, a separate page move key does not need to be provided. This will be described below in detail with reference to FIG. 4.

Furthermore, information on the current program name highlighted by the focus may be displayed on a separate region of the page screen. Therefore, while continuously moving the focus, the viewer may select and watch information on current-broadcast programs, at step S60.

That is, broadcasting program information including a currently-broadcast frame image of a broadcasting program, a next program name, a broadcasting time, a channel number, a channel name, a channel logo and so on may be displayed on the separate region of the current page screen. At this time, the broadcasting program information displayed on the separate region may be provided as small characters or small images in such a range as not to have an effect on displaying a list of current program names.

Furthermore, as the lasting time and the remaining time of the broadcasting program corresponding to the current program name are displayed as a graph on the current page, it is possible to provide simplified time information without occupying a large space.

Then, when the viewer presses an OK and confirm button or the like to select the focused current program name, the TV set is tuned to the corresponding channel such that the viewer may watch the corresponding broadcasting program.

Figure 4:
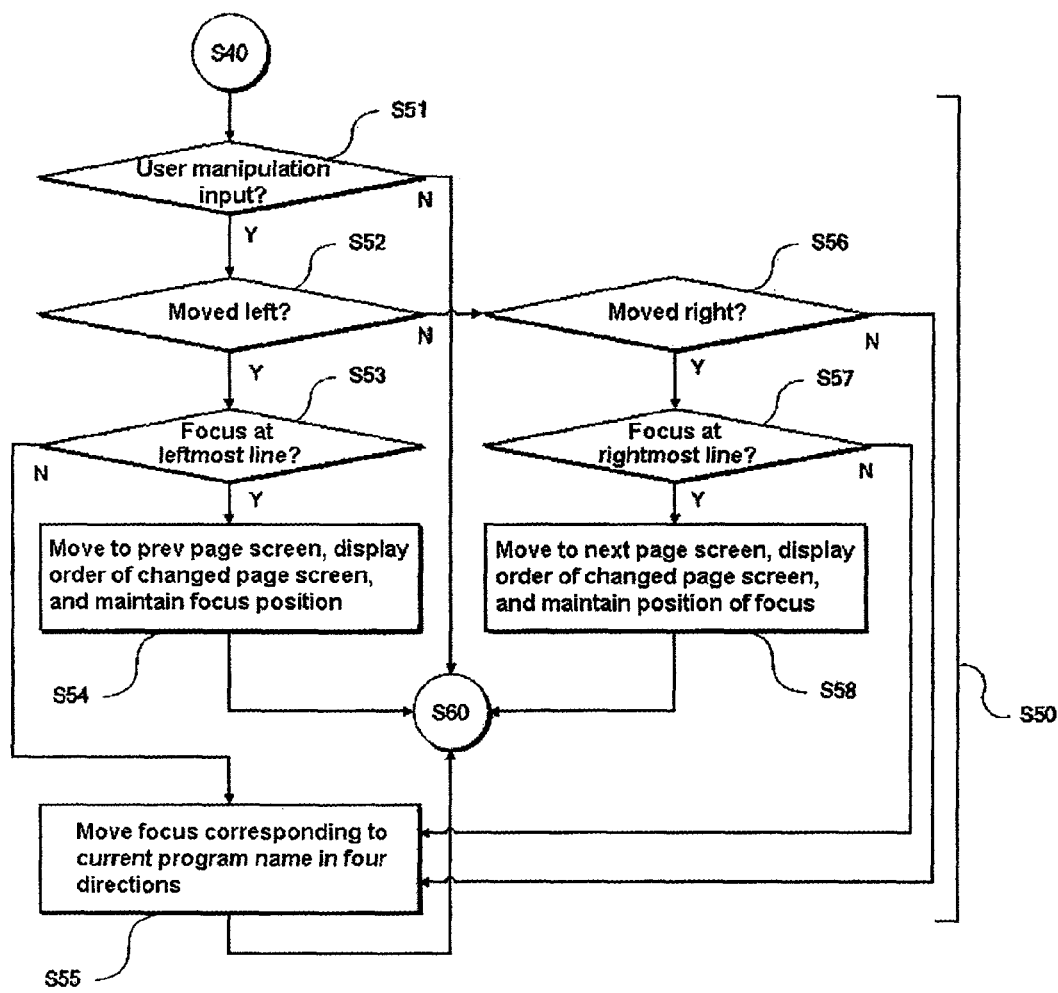
FIG. 4 is a detailed flow chart showing a process in which a focus movement and a page screen movement are performed according a user manipulation in FIG. 3.

FIG. 4 is a detailed flow chart showing the process in which the focus movement and the page screen movement are performed according a user manipulation in FIG. 3.

First, it is determined whether or not a user manipulation input occurs while a page screen of the EPG is displayed, at step S51.

According to the user manipulation input, a focus movement or page screen movement is performed. However, when it is determined that a user manipulation input did not occur, the process proceeds to step S60 of displaying the information of a current program name focused on the current page screen without a separate process.

When it is determined that a left movement command occurs at step S52 and the focus is currently positioned at the leftmost line at step S53, the current page screen is moved to the previous page screen at step S54.

Furthermore, when it is determined that a right movement command occurs at step S56 and the focus is currently positioned at the rightmost line at step S57, the current page is moved to the next page screen at step S58.

As such, when a command to move the current page to the outside in the left or right direction occurs, the current page is moved to the previous or next page screen.

After the page movement is performed, the position of the focus on the entire screen may be maintained as it is. Then, the current screen page may be consecutively moved to the previous page screen through a consecutive left movement command or may be consecutively moved to the next page screen through a consecutive right movement command.

As such, the page screen may be moved quickly and easily through an input command to move the focus, without a separate page move button. Therefore, all current program names composing the EPG may be searched through several key manipulations.

Furthermore, when a user manipulation input occurs but does not correspond to the page movement command, the focus highlighting a current program name is moved in a corresponding direction on the current page screen, at step S55.

Figure 5A:
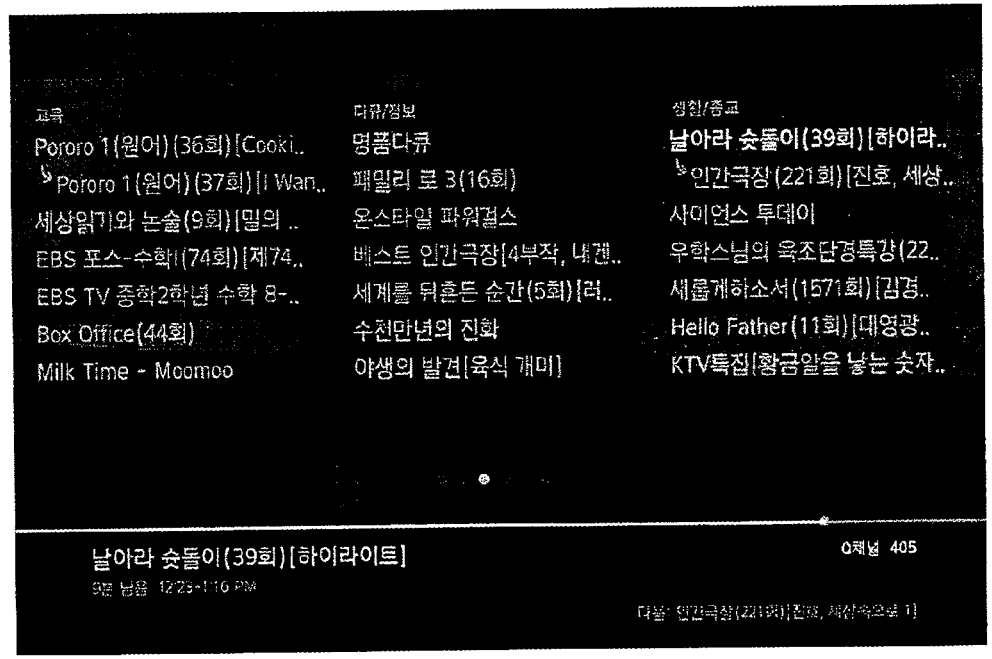
FIGS. 5A and 5B are screen shots showing a page screen of the EPG in which current program names are arranged in a column for each genre, according to the embodiment of the present invention.
Figure 5B:
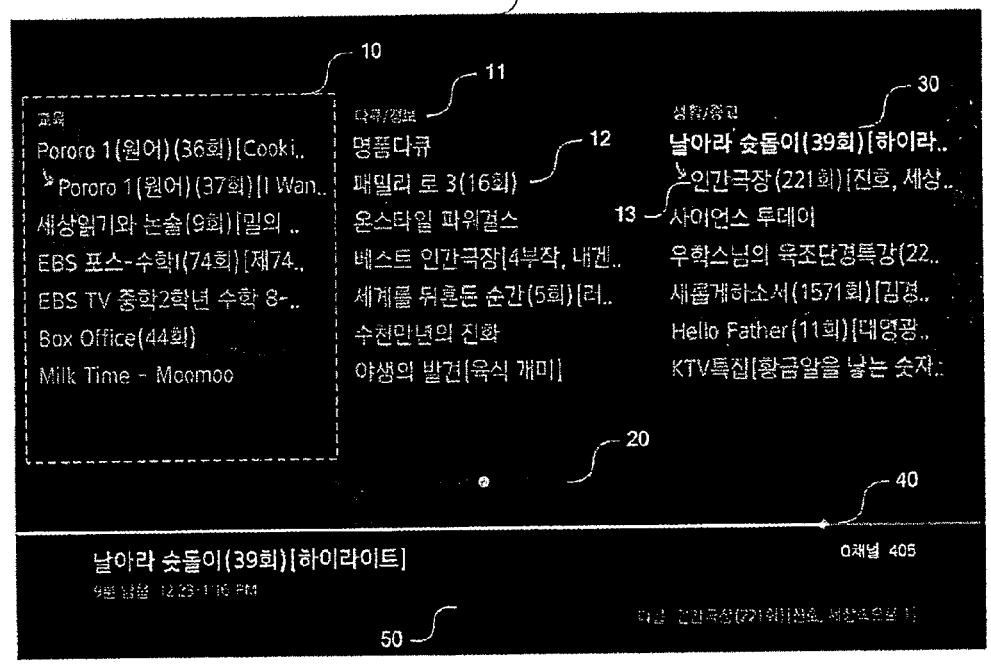

FIGS. 5A and 5B are screen shots showing a page screen of the EPG in which current program names are arranged in a column for each genre, according to the embodiment of the present invention.

As described above, the EPG may include one or more page screens. FIG. 5A shows one page screen 100 which is being displayed through a TV screen. FIG. 5B includes reference numerals attached to the same screen shot, for convenience of description. Referring to FIGS. 5A and 5B, the EPG according to the embodiment of the present invention may be displayed as a transparent graphic over a TV broadcasting image.

As described above, the page screen 100 includes a plurality of program name display regions 10. Desirably, as shown in FIGS. 5A and 5B, the page screen 100 may be divided in a vertical direction such that the respective program name display regions 10 are arranged in a line.

Each of the program name display regions 10 has a classification criterion 11 positioned at the upper end thereof and includes current program names 12 which correspond to the classification criterion 11 and are arranged in a column under the classification criterion 11. The classification criteria 11 shown in FIGS. 5A and 5B may be set for a variety of genres such as 'Education' and 'Docu/Info'. For users' convenience, an item for recently watched channels, recommended programs, or favorite channels may be separately added.

As described above, the current program name 12 is limited to the name of a currently-broadcast program or a text obtained by reducing the name. Referring to FIGS. 5A and 5B, when a broadcasting program has a long name, a part of the name which is cut from the corresponding region is represented by ' . . . '. However, it can be seen that viewers have no difficulties in checking the name of the broadcasting program.

When the currently-broadcast program is immediately finished, for example, in 10 minutes, the name of a next program which is to be broadcast immediately, that is, a next program name 13 may be displayed with an arrow under the current program name 12. In FIGS. 5A and 5B, it can be seen that 'Fly, shooting boys (39)' has nine minutes until the finish time thereof. Therefore, 'Human Theater (221)' 13 which is to be broadcast after 'Fly, shooting boys (39)' is discriminated and indicated by an arrow. Furthermore, it can be seen that 'Pororo (36)' is immediately finished, and 'Pororo (37)' will be broadcast.

FIGS. 5A and 5B show that information on 'Fly, shooting boys (39)' highlighted by the focus is displayed on a separate region 50 in the lower side of the page screen 100. That is, information on the start time and the finish time of the broadcasting program, a remaining time until the finish time, a next program name and so on may be displayed. Furthermore, a variety of information which is not shown in FIG. 5 may be provided. In addition, a channel name, a channel logo, a channel number and so on may be displayed as small characters.

The lasting time and the remaining time of 'Fly, shooting boys (39)' highlighted by the focus are indicated by a graph 40.

A viewer may move the position of the focus 30 in four directions by using a key manipulation unit such as a remote control. After the viewer moves the focus to the leftmost or rightmost position, the viewer may move the current page screen to the previous or next page screen.

At this time, an identification symbol 20 is displayed to indicate the order of the current page screen such that the viewer may figure out where the current page screen is positioned in the EPG. Through the identification symbol 20, it can be seen that the EPG includes six pages and the current page screen is a third page screen.

Figure 6A:
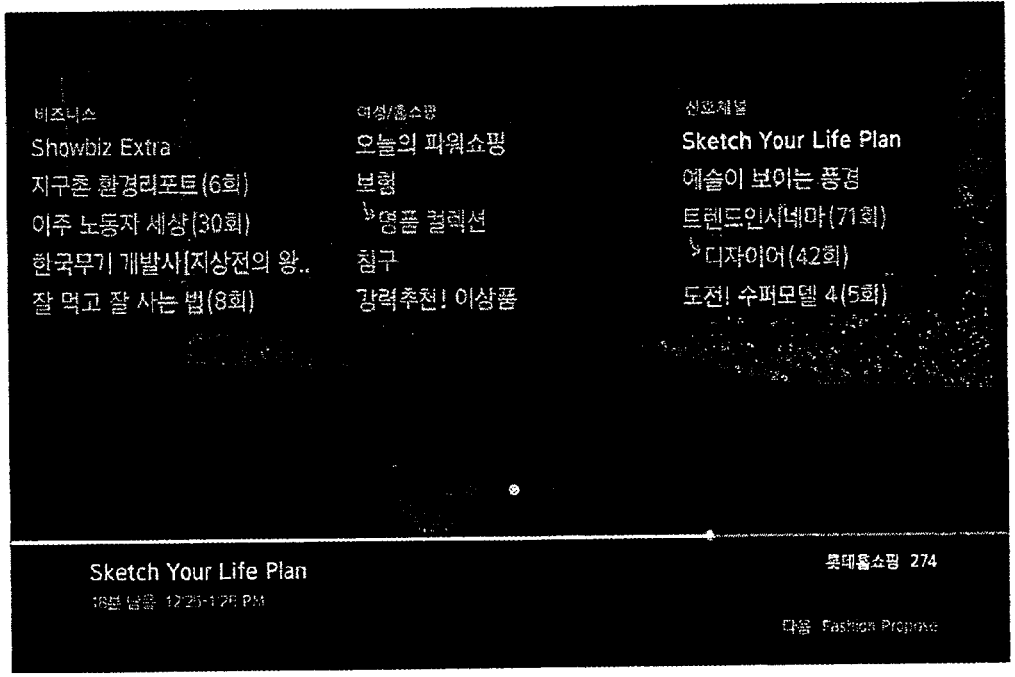
FIGS. 6A and 6B are screen shots showing a previous page screen and a next page screen of the EPG to which the current page screen is moved by a user manipulation.
Figure 6B:
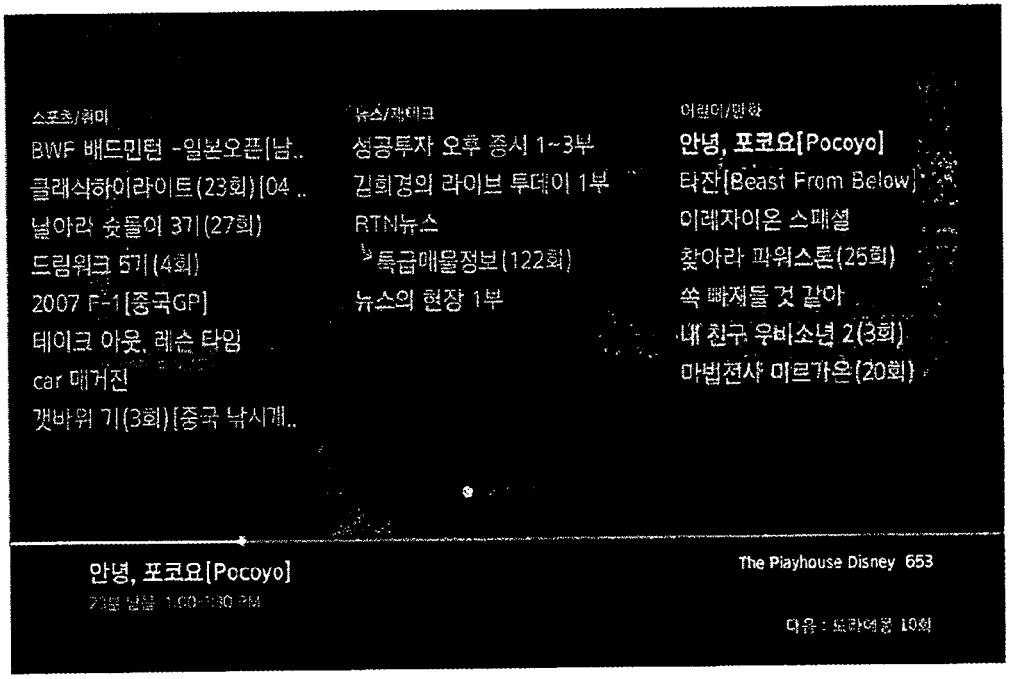

FIGS. 6A and 6B are screen shots showing a previous page screen and a next page screen of the EPG to which the current page screen is moved by a user manipulation. FIG. 6A shows that the page screen of FIG. 5 is moved to the next page screen, and FIG. 6B shows that the page screen of FIG. 5 is moved to the previous page screen.

When the viewer moves the focus to the right side in a state in which the focus 30 is positioned at the right end of the current page screen in FIG. 5, the current page screen is moved to the next page screen, and the next page screen is displayed on the TV screen. In FIG. 6A, 'Sketch Your Life Plan' displayed at the same position is highlighted by the focus. Furthermore, it can be seen through the identification symbol that the page screen has been moved to a fourth page screen.

Furthermore, a slide animation effect or the like may be used when the page screen is moved. Through the slide animation effect, the viewer can recognize that the page screen is moved to another page screen.

Then, when the viewer presses the OK and confirm button to select a current program name highlighted by the focus, the current page screen is moved to a channel of a broadcasting program corresponding to the selected program name such that the viewer may watch the broadcasting program.

FIG. 6B shows the page screen of FIG. 5 was moved to the previous page screen. It can be seen that the page screen was moved to a second page screen, through the identification symbol indicating the order of the page screen. In FIG. 6B, a second circle of the identification symbol is highlighted.

Figure 7:
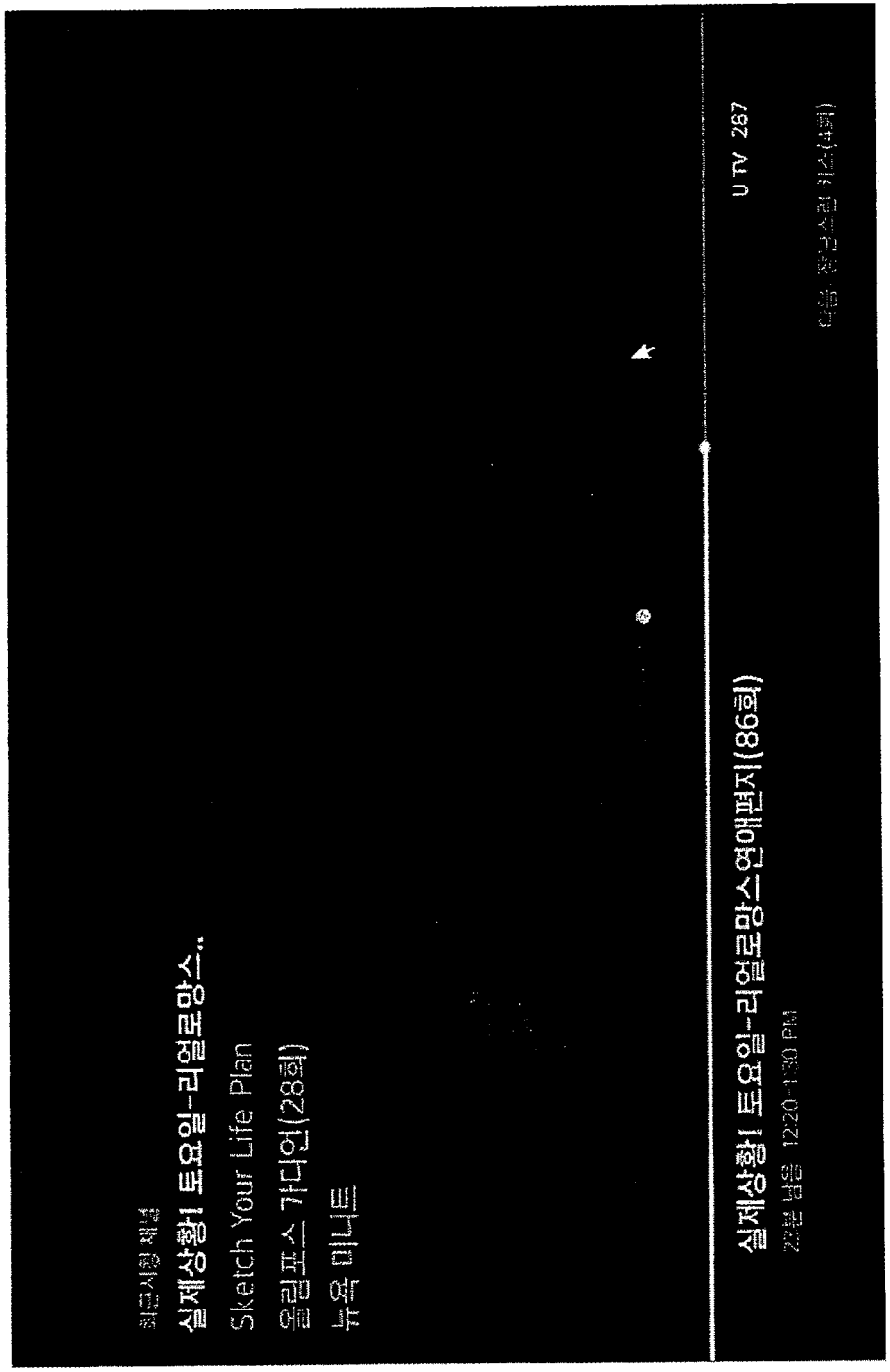
FIG. 7 is a screen shot showing the last page screen of the EPG, on which a current program name is highlighted in a state which a classification criterion is set to recently watched channels.

FIG. 7 is a screen shot showing the last page screen of the EPG, on which the current program name is highlighted in a state which a classification criterion is set to recently watched channels.

Through the identification symbol indicating the order of the page screen, it can be seen that the last page screen of the EPG is a sixth page screen. Furthermore, since the classification criterion is set to 'recently watched channels', the recently watched channels are separately collected and displayed.

The recently watched channels are a group of broadcasting channels which are watched within a predetermined time range. For example, the predetermined time range may be set to recent three hours, six hours, 12 hours, or 24 hours.

In addition, recommended programs, favorite channels or the like may be added to the classification criteria.

Figure 8:
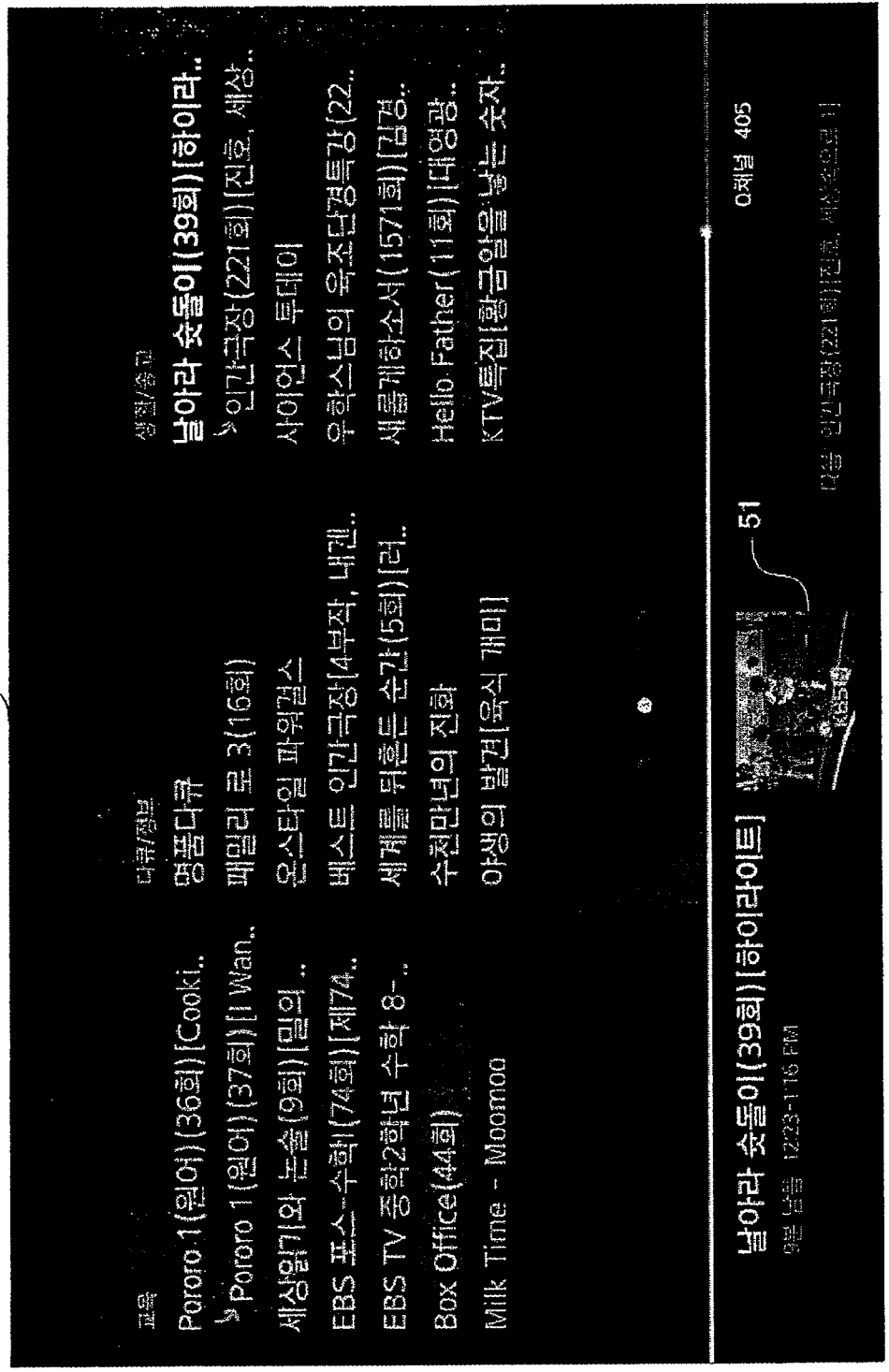
FIG. 8 is a screen shot showing an example including a current broadcast frame image of the current program name highlighted by a focus in FIG. 5.

FIG. 8 is a screen shot showing an example including a current broadcast frame image of the current program name highlighted by the focus in FIG. 5.

In FIG. 8, a current broadcast frame image 51 may be displayed as information on the current program name 30 highlighted by the focus on a separate region of the current page screen of FIG. 5. At this time, a freeze-frame image or a video image may be provided as the current broadcast frame image.

Figure 9:
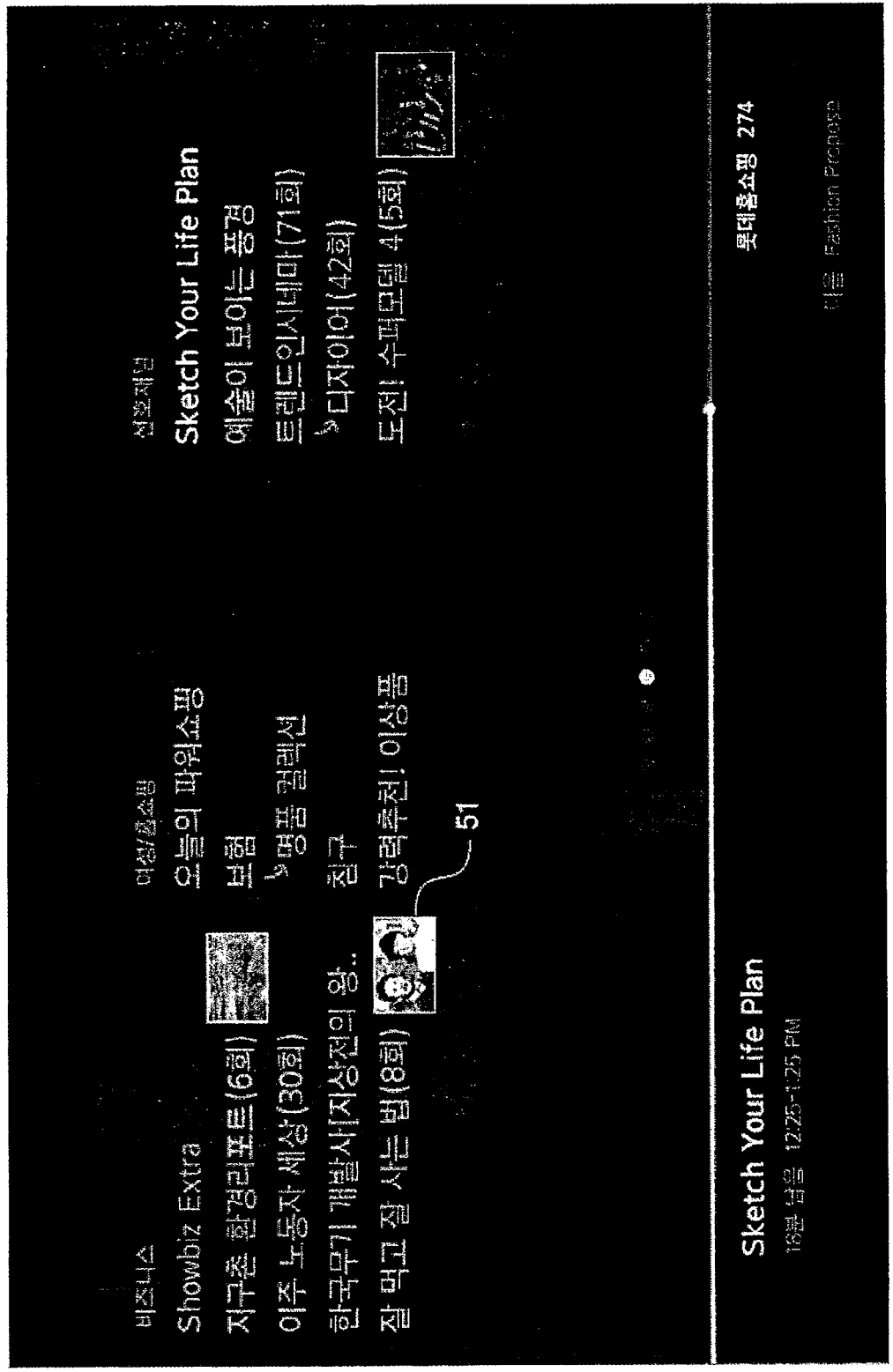
FIG. 9 is a screen shot showing that snapshot images of last watched frames are displayed with the current program name in FIG. 6A.

FIG. 9 is a screen shot showing that snapshot images of last watched frames are displayed with the current program name in FIG. 6A.

More specifically, the snapshot images of the last watched frames for the previously watched broadcasting programs on the current page screen of FIG. 6A are displayed with the current program name. Therefore, the viewer can recognize which channels have been previously watched.

That is, when a broadcasting program corresponding to the current program name has been watched in the past and is not yet finished, a snapshot image of the last watched frame of the broadcasting program is displayed with the current program name.

Then, when the broadcasting program is finished, the snapshot image of the last watched frame is deleted from the page screen. Accordingly, the viewer may recognize that the broadcasting program was finished.

Figure 10:
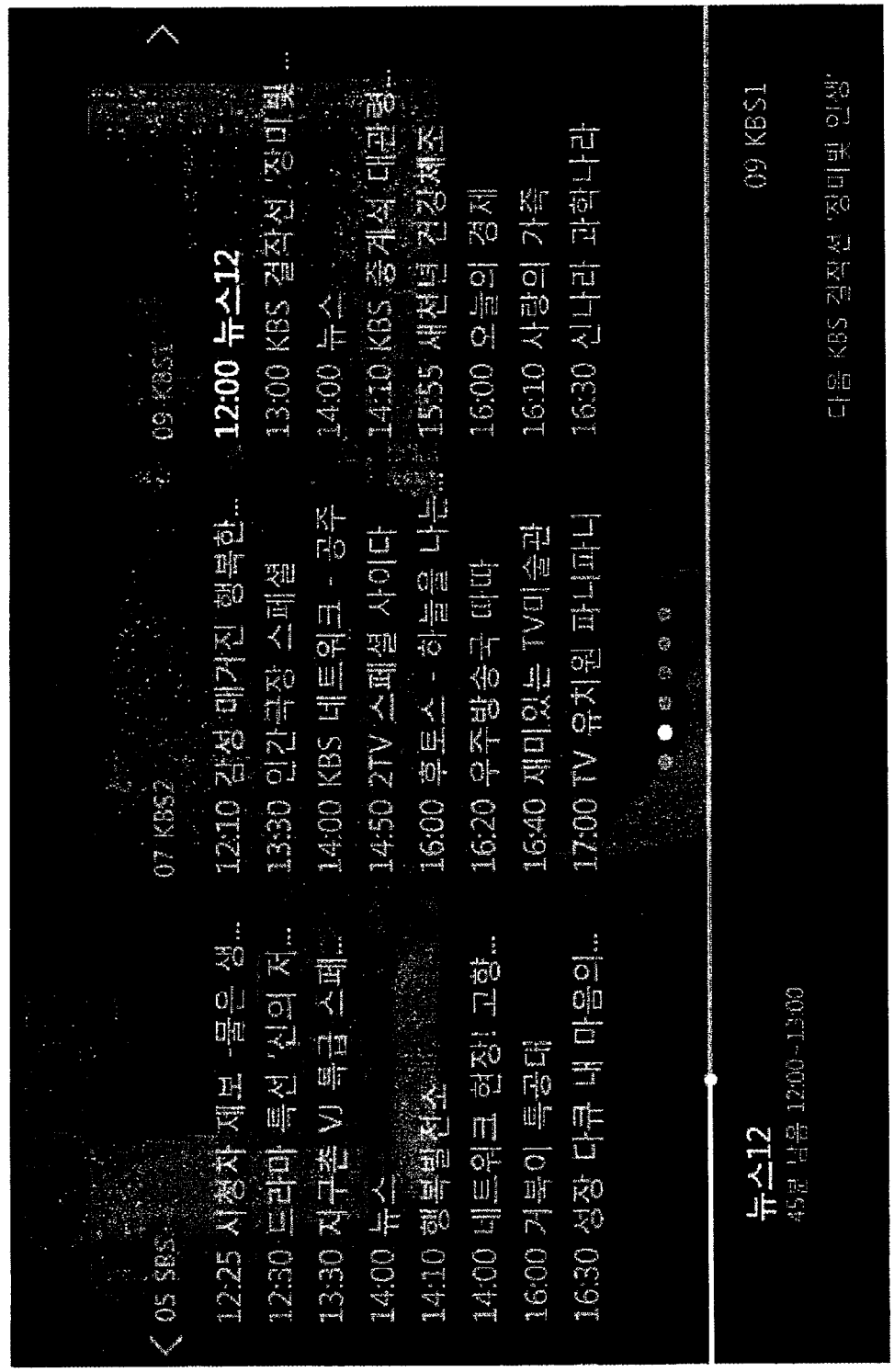
FIG. 10 is a screen shot showing a page screen of the EPG providing a list of programs which are to be broadcast in the future, for each channel.

FIG. 10 is a screen shot showing a page screen of the EPG providing a list of programs which are to be broadcast in the future, for each channel.

That is, in addition to the page screens showing which programs are currently broadcast as shown in FIGS. 5 to 9, the viewer can receive a page screen providing a list of programs which are to be broadcast after the present time for each channel through a separate key manipulation of a remote control, as shown in FIG. 10 in which the channel is set to an axis.

For example, when the viewer presses an [EPG] button of the remote control, the page screen showing current program names may be displayed in the form as shown in FIG. 5. Then, when the viewer presses the [EPG] button one more time, the page screen showing a list of next broadcasting programs for each channel may be displayed as shown in FIG. 10. Therefore, the viewer may easily select a desired page screen of the EPG by manipulating the [EPG] button.

Figure 11:
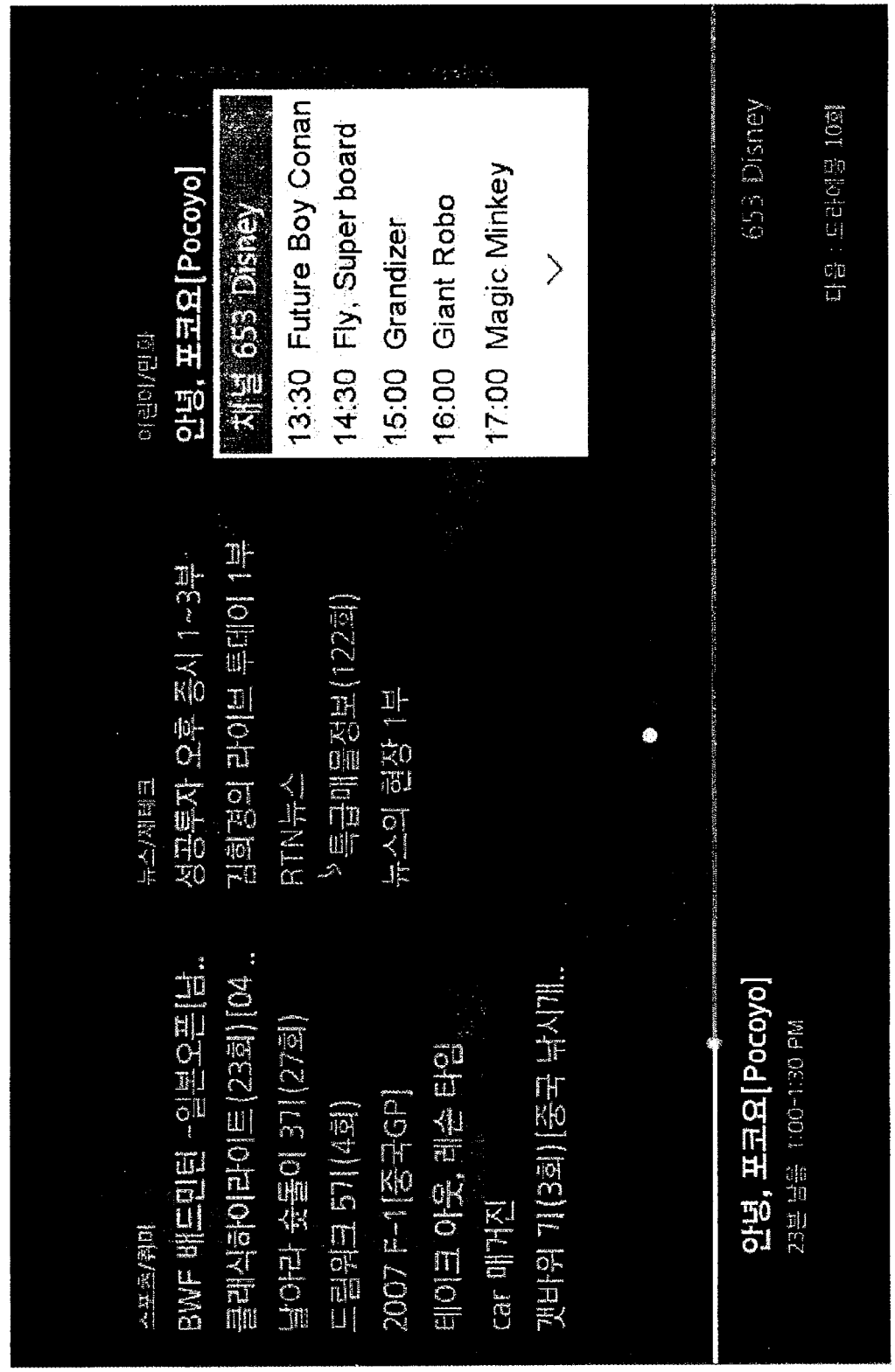
FIG. 11 is a screen shot showing a page screen of the EPG which displays a list of programs to be broadcast after a focused and selected current program name, with a pop-up window.

FIG. 11 is a screen shot showing a page screen of the EPG which displays a list of programs to be broadcast after a focused and selected current program name, with a pop-up window.

More specifically, when the focus is continuously maintained for one to several seconds or the viewer presses a specific button of the remote control on the page screen showing the current program names as described with reference to FIGS. 5 to 9, a next broadcasting program list of the corresponding channel may be displayed by a pop-up window as shown in FIG. 11.

While the invention has been shown and described with respect to the preferred embodiments, it will be understood by those skilled in the art that various changes and modifications may be made without departing from the scope of the invention as defined in the following claims.

The invention claimed is:

1. A method for displaying an electronic program guide (EPG), comprising the steps of:
   (A) receiving broadcasting signals;
   (B) collecting broadcasting program information from received broadcasting signals;
   (C) acquiring information of currently-broadcast programs from the broadcasting program information;
   (D) forming an EPG which includes one or more page screens each having a plurality of program name display regions, wherein the program name display regions are classified according to preset classification criteria and texts each including a part of the name of a current-broadcast program (hereinafter, referred to as 'current program names') are listed in each of the classified program name display regions;
   (E) displaying a page screen through a display unit;
   (F) moving a focus on the program names arranged on the page screen in four directions according to a user manipulation; and
   (G) displaying information on a current program name corresponding to the focus on a separate region of the page screen,
   wherein the step (B) comprises the step of acquiring information on a program which is to be broadcast after the currently-broadcast program, and
   the step (C) comprises the step of arranging a text including a part of the name of a next program (hereinafter, referred to as 'next program name') such that the next program name is associated with the current program name, when a finish time of the currently-broadcast program falls within a preset reference time from the present time,
   wherein the step (E) comprises the step of displaying an identification symbol on the page screen, the identification symbol indicating the order of a current page screen among the entire page screens forming the EPG, and
   the step (F) comprises the steps of:
   when the movement of the focus based on the user manipulation is performed toward the outside of the page screen in the left or right direction, displaying a previous page screen or next page screen; and
   reflecting the change in the order of the current page screen, which is caused by the page movement, into the identification symbol, and displaying the identification symbol on the page screen,
   wherein the step (F) comprises the step of maintaining the position of the focus on the entire screen, when the movement of the page screen is performed,
   wherein the step (G) comprises the step of displaying a lasting time and a remaining time of a broadcasting program corresponding to the current program name where the focus is positioned, by using a graph,
   wherein the step (C) comprises the step of vertically dividing the page screen into the plurality of program name display regions, and vertically arranging the classification criteria and the current program names in the respective program name display regions to form the EPG,
   further comprising the steps of:
   when a broadcasting program corresponding to the current program name was watched and is not yet finished, displaying a snapshot image of a last watched frame of the broadcasting program with the current program name; and
   when the broadcasting program is finished, removing the snapshot image of the last watched frame from the page screen.

2. The method according to claim 1, wherein the step (C) comprises the step of adding one or more of genres, recently-watched channels, recommended programs, and favorite channels to the classification criteria and arranging the current program names according to the classification criteria.

3. The method according to claim 1, wherein the step (G) comprises the step of displaying one or more of a current broadcast frame image, the next program name, a broadcasting time, a channel number, a channel name, and a channel logo of the current program name corresponding to the focus, on the separate region of the page screen.

4. The method according to claim 3, further comprising the step of, when the focus highlighting one of the current program names is continuously maintained for a preset time or a separate user manipulation occurs, displaying a list of programs which are to broadcast after the current program name corresponding to the focus, by using a pop-up window.

* * * * *